(12) United States Patent
Fieres et al.

(10) Patent No.: US 6,178,504 B1
(45) Date of Patent: Jan. 23, 2001

(54) HOST SYSTEM ELEMENTS FOR AN INTERNATIONAL CRYPTOGRAPHY FRAMEWORK

(75) Inventors: Helmut Fieres, Gaufelden (DE); Roger Merckling, Palo Alto; Keith Klemba, Palo Alto, both of CA (US)

(73) Assignee: Cheyenne Property Trust c/o Data Securities International, Inc., San Francisco, CA (US)

(*) Notice: Under 35 U.S.C. 154(b), the term of this patent shall be extended for 0 days.

(21) Appl. No.: 09/041,349

(22) Filed: Mar. 12, 1998

(51) Int. Cl.[7] .................................................. H04L 9/00
(52) U.S. Cl. .......................... 713/164; 713/151; 713/152; 713/172; 713/191
(58) Field of Search .................................. 713/151, 152, 713/172, 164, 191

(56) References Cited

U.S. PATENT DOCUMENTS 5,502,766 * 3/1996 Boebert et al. ....................... 713/193
5,949,975 * 9/1999 Batty et al. ........................... 709/213

OTHER PUBLICATIONS

The Open Group, Common Security: CDSA and CSSM, 1997, The Open Group..*
Intel Corporation, Apr. 1998, Common Data Security Architecture (Presentation), Developers' Insight: Intel's Web Site for Developers on CD–Rom, p. 20.*
The Open Group, The Open Group Members List, As of Feb. 16, 2000, The Open Group.*

* cited by examiner

Primary Examiner—Tod R. Swann
Assistant Examiner—Ronald Sulpizio

(57) ABSTRACT

An international cryptography framework (ICF) is provided that allows manufacturers to comply with varying national laws governing the distribution of cryptographic capabilities. In particular, such a framework makes it possible to ship worldwide cryptographic capabilities in all types of information processing devices (e.g. printers, palm-tops). The ICF comprises a set of service elements which allow applications to exercise cryptographic functions under the control of a policy. The four core elements of the ICF architecture, i.e. the host system, cryptographic unit, policy activation token, and network security server, comprise an infrastructure that provides cryptographic services to applications. Applications that request cryptographic services from various service elements within the ICF are identified through a certificate to protect against misuse of a granted level of cryptography. The host system comprises a set of system programs and services which provide the application with an execution environment. The host system's role within the ICF is twofold. First, the host system provides services to the application in the form of programming interfaces to access the functions offered by the cryptographic unit. Second, the host system provides support for the cryptographic unit in building trust relationships to the host system elements, such as the cryptographic programming interfaces, operating systems drivers, and memory management subsystems.

31 Claims, 6 Drawing Sheets

HOST SYSTEM ELEMENTS FOR AN INTERNATIONAL CRYPTOGRAPHY FRAMEWORK

BACKGROUND OF THE INVENTION

1. Technical Field

The invention relates to cryptography. More particularly, the invention relates to host system elements for an international cryptography framework.

2. Description of the Prior Art

Customers of large computer systems are typically multinational corporations that want to purchase enterprise wide computer based solutions. The distributed nature of such organizations requires them to use public international communications services to transport data throughout their organization. Naturally, they are concerned about the security of their communications and seek to use modern end-to-end cryptographic facilities to assure privacy and data integrity.

The use of cryptography in communications is governed by national policy and unfortunately, national policies differ with respect to such use. Each national policy is developed independently, generally with a more national emphasis rather than international considerations. There are standards groups that are seeking to develop a common cryptographic algorithm suitable for international cryptography. However, the issue of international cryptographic standards is not a technical problem, but rather it is a political issue that has national sovereignty at its heart. As such, it is not realistic to expect the different national cryptography policies to come into alignment by a technical standardization process.

The issue of national interests in cryptography is a particular concern of companies that manufacture open-standards-based information technology products for a worldwide market. The market expects these products to be secure. Yet, more and more consumers of these products are themselves multinational and look to the manufacturers to help them resolve the international cryptography issues inhibiting their worldwide information technology development. The persistence of unresolved differences and export restrictions in national cryptography policies has an adverse impact on international market growth for secure open computing products. Thus, it would be helpful to provide an international framework that provides global information technology products featuring common security elements, while respecting the independent development of national cryptography policies.

Nations have reasons for adopting policies that govern cryptography. Often these reasons have to do with law enforcement and national security issues. Within each country there can be debates between the government and the people as to the rightness and acceptability of these policies. Rather than engage in these debates or try to forecast their outcome, it is more practical to accept the sovereign right of each nation to establish an independent policy governing cryptography in communication.

Policies governing national cryptography not only express the will of the people and government, but also embrace certain technologies that facilitate cryptography. Technology choice is certainly one area where standardization can play a role. However, as indicated earlier this is not solely a technical problem, such that selection of common cryptographic technologies alone can not resolve the national policy differences. Consequently, it would be useful to provide a common, accepted cryptography framework, wherein independent technology and policy choices can be made in a way that still enables international cryptographic communications consistent with these policies.

A four-part technology framework that supports international cryptography, which includes a national flag card, a cryptographic unit, a host system, and a network security server is disclosed by K. Klemba, R. Merckling, International Cryptography Framework, in U.S. Pat. No. 5,651,068, issued Jul. 22, 1997. Three of these four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements.

The framework supports the design, implementation, and operational elements of any and all national policies, while unifying the design, development, and operation of independent national security policies. The framework thus gives standard form to the service elements of national security policies, where such service elements include such things as hardware form factors, communication protocols, and on-line and off-line data definitions.

Critical to the implementation of the framework is the provision of a fundamental technology that allows the production of the various service elements. While various implementations of the service elements are within the skill of those versed in the relevant art, there exists a need for specific improvements to the state of the art if the full potential of the framework is to be realized.

In particular, it would be desirable for the host system elements of such framework to provide support services to applications, policies, and Operating Systems that run within such framework, e.g. support for applications would include an application programming interface (API) to allow access to the cryptographic services in the cryptographic unit. Further, it would be desirable for such host system elements to provide support for the cryptographic unit in building trust relationships between the host system elements and the cryptographic unit.

SUMMARY OF THE INVENTION

An international cryptography framework (ICF) is provided that allows manufacturers to comply with varying national laws governing the distribution of cryptographic capabilities. In particular, such a framework makes it possible to ship worldwide cryptographic capabilities in all types of information processing devices (e.g. printers, palmtops). The ICF comprises a set of service elements which allow applications to exercise cryptographic functions under the control of a policy. The four core elements of the ICF architecture, i.e. the host system, cryptographic unit, policy card, and network security server, comprise an infrastructure that provides cryptographic services to applications. Applications that request cryptographic services from various service elements within the ICF are identified through a certificate to protect against misuse of a granted level of cryptography. The policy may take into consideration attributes contained in the Application Certificate.

The host system comprises a set of system programs and services which provide the application with an execution environment. The host system's role within the ICF is twofold. First, the host system provides services to the application in the form of programming interfaces to access the functions offered by the cryptographic unit. Second, the host system provides support for the cryptographic unit in building trust relationships to the host system elements, such as the cryptographic programming interfaces, operating systems drivers, and memory management subsystems.

DETAILED DESCRIPTION OF THE INVENTION

National cryptography policy often varies by industry segment, political climate, and/or message function. This makes it difficult to assign one uniform policy across all industries for all time. Consequently, the flexibility of a cryptography framework that incorporates a National Flag Card, a.k.a. a policy activation token (PAT) is very attractive. The invention is therefore directed to resolving problems surrounding international cryptography. The invention preferably resides in an International Cryptography Framework (ICF) that allows manufacturers to comply with varying national laws governing the distribution of cryptographic capabilities. In particular, such a framework makes it possible to ship worldwide cryptographic capabilities in all types of information processing devices (e.g. printers, palmtops).

ICF Elements

Figure 1:
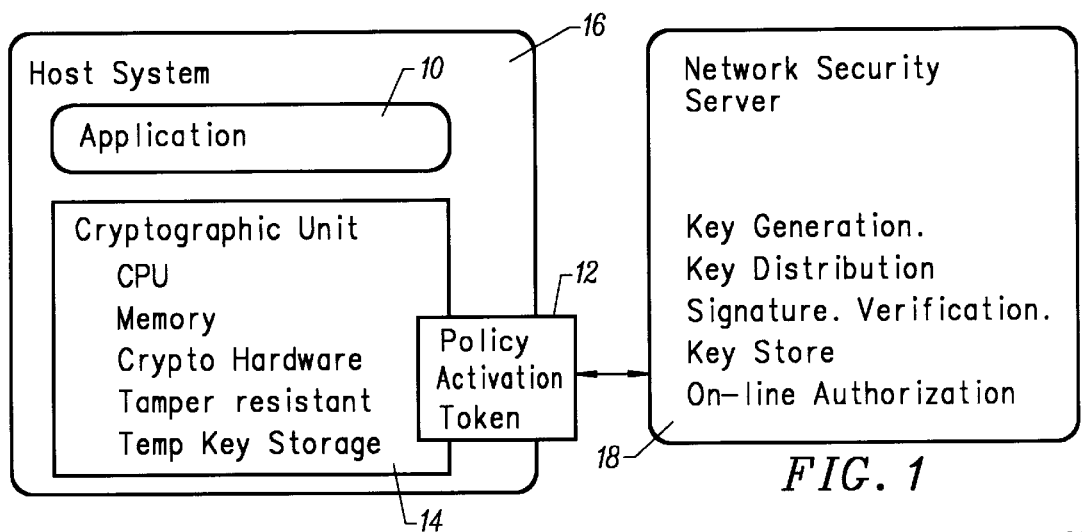
FIG. 1 is a block diagram of an international cryptography framework, including a National Flag Card (also referred to herein as a policy activation token), a cryptographic unit, a host system, and a network security server according to the invention.

The invention preferably resides in an international cryptography framework that has four service elements, each offering different types of services. FIG. 1 is a block diagram of the international cryptography framework (ICF), including a Policy Activation Token 12, a Cryptographic Unit 14, a Host System 16, and a Network Security Server 18. Three of the four service elements have a fundamentally hierarchical relationship. The Policy Activation Token (PAT) is installed into the Cryptographic Unit (CU) which, in turn, is installed into a Host System (HS). The Host System runs an application 10 that may require cryptographic services. Cryptographic functions on the Host System cannot be executed without a Cryptographic Unit, which itself requires the presence of a valid Policy Activation Token before it's services are available, e.g. to the application via the Host system. For purposes of the discussion herein, the Policy Activation Token is also referred to as the policy card because it provides the discipline that exerts a national cryptography policy.

The fourth service element, a Network Security Server (NSS), provides a range of different security services, including verification of the other three service elements, and thus acts as a trusted third party. Messages encrypted using the proposed framework carry an electronic stamp identifying the national cryptography policy under which the message was encrypted. The Network Security Server also provides stamp verification services for message handling systems.

As discussed above, the four basic elements of the ICF architecture are the host system, the cryptographic unit, the policy activation token, and the network security server. For purposes of the discussion herein, these elements of the ICF are defined as follows:

Host System (HS). The HS is the system or unit that contains a Cryptographic Unit (CU). This element of ICF supports an Application Programming Interface to a CU. It also supports applications 10 that are security aware and that make use of the CU. These applications are bound tightly to the CU during runtime.

Cryptographic Unit (CU). The CU is the system or unit that contains the cryptographic functions. These functions are dormant and cannot be used by the HS until activated by a PAT. The cryptographic functions which are included in the CU are typically determined by business demand. The CU is tamper resistant so as to protect any keys that may be stored therein. It is the CU's responsibility to participate in all PAT maintenance activities. Failing to do so, results in the CU's functionality returning to the dormant state.

Policy Activation Token (PAT). The PAT is the token that contains cryptography usage policy. Specifically, this element of the ICF contains parameters that govern the use of cryptography in a specific CU. Policy activation tokens can be in physical form, virtual form, and a fixed form. Physical PATs are physical tokens, such as a smart card, containing the cryptographic usage policy; virtual PATs are software elements containing cryptographic usage policy which can be sent over networks to the target CU; and fixed PATs are bound to a single application and contain the cryptographic usage policy for those applications.

Network Security Server (NSS). The NSS is the system or unit that acts as a trusted third party to provide networked services to HSs and CUs. These services include, for example, policy enhancements, unit verification, adjustments to authorizations, and key management services.

As an element of the ICF architecture, the host system contains some unique characteristics. The invention herein focuses on these characteristics of the host system of the ICF.

Operating System Support Elements
ICF Runtime Environment

Figure 2:
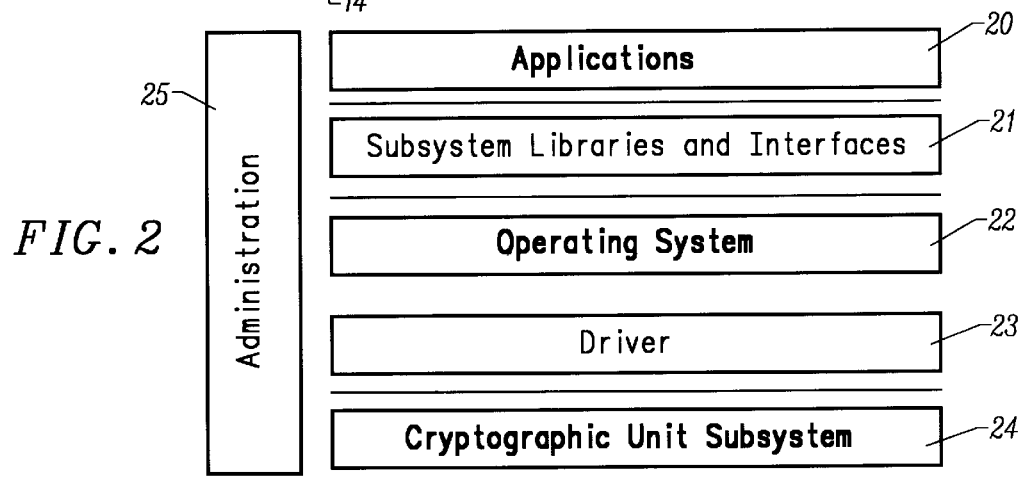
FIG. 2 is a block diagram showing a software architecture overview according to the invention.

The ICF host system software architecture describes the layers of libraries and system elements which are needed to implement the ICF elements on a given host system. In general, there are three important layers, i.e. application, operating systems, and cryptographic service providers. FIG. 2 provides an overview of the main software architecture elements.

Applications. The application layer 20 is the area of user written applications and libraries which need cryptographic services. An application may or may not be aware of these services. In case they are aware, the subsystem layer 21 below offers a set of programming interfaces to the application. Cryptographically unaware applications do not issue any calls themselves, the underlying subsystem performs these on behalf of the application.

Subsystem Libraries and Interfaces 21. Subsystems which support cryptographic functions for aware and unaware applications. These subsystems also provide APIs to the applications. Most notable APIs include the Microsoft CAPI for Microsoft applications, and the X/Open GSS-API and GCS-API for Unix applications. Subsystem libraries typically organize themselves into application programming interfaces and, shielded through the operating system, into a cryptographic service provider module.

The subsystem libraries may also hide the security APIs completely from the application. This allows existing applications to take advantage of the solution without being modified. An example is the integration of security features into transport level software subsystems.

Other elements of this layer may provide APIs for accessing the CU secure storage and execution facilities. For example, a database API such as the ODBC interface could be offered along with a data manager module inside the CU to provide a tamper resistant database.

Operating Systems and Drivers. The operating system 22 performs two primary tasks. One is to isolate the subsystem programming interfaces from the cryptographic service providers. The other task is to provide the necessary hardware control through a set of drivers 23 which interface with the cryptographic hardware in form of hardware drivers.

Cryptographic Unit Subsystem 24. This layer contains the hardware implementation and firmware elements of the cryptographic functions. The hardware typically comes in several form factors, such a PCI card or a PCMCIA card, to accommodate the different hardware platforms and performance requirements. The firmware is a set of libraries which implement a runtime (which is similar to a micro-kernel), the ICF functionality, and user downloadable software modules required by a particular application programming interface.

Administration. The administration 25 element is responsible for providing a management framework for the entire solution. This includes, for example, middleware components for administrative functions, such as certificate management, application class of service management, and downloading of application specific extensions to the CU.

ICF Management Framework

Figure 3:
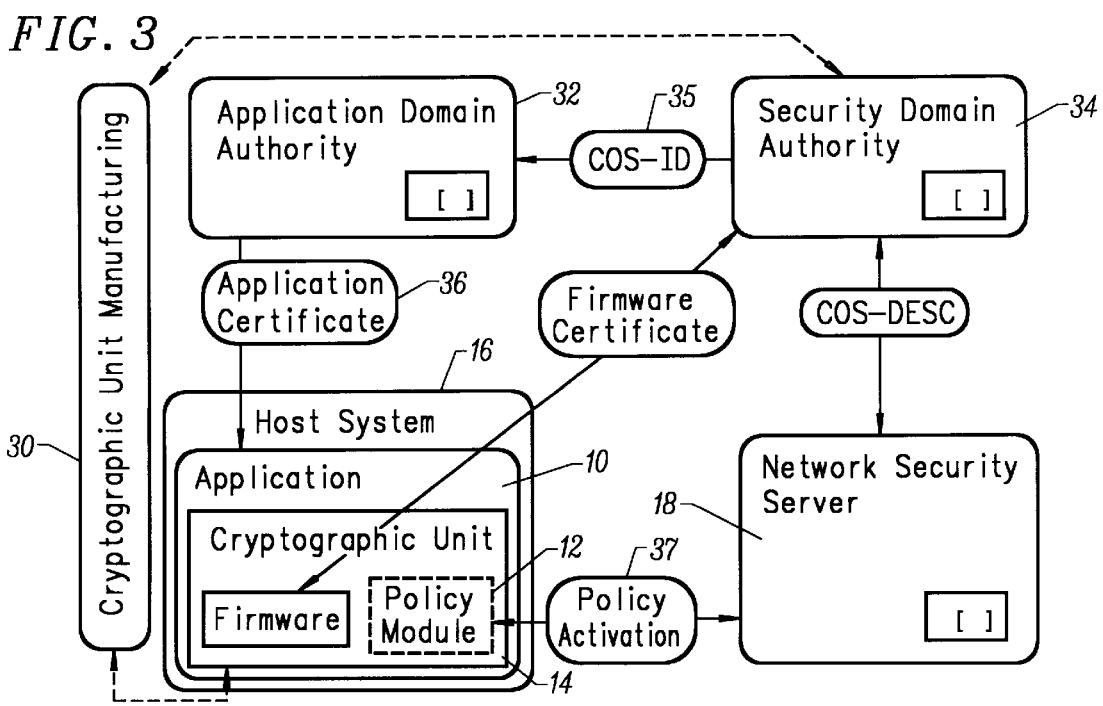
FIG. 3 is a block diagram showing ICF management elements according to the invention.

FIG. 3 is a block diagram showing ICF management elements according to the invention. Around the core elements of the ICF are the manufacturers of the cryptographic equipment 30 and the domain authorities 32/34 which implement the policy definition and enforcement through the framework. There are four basic elements within the administration framework. They are the Security Domain Authority 34, the Application Domain Authority 32, the Host System Elements 16, and the Network Security Server 18.

Security Domain Authority. The security domain authority (SDA) is the institution which defines the security policies. Security policies are presented to the other framework elements via classes of services. Knowledge of manufacturing information allows the system to create classes of services targeted to a deterministic set of CUs.

Application Domain Authority. The Application Domain Authority (ADA) acts as the authority to create certificates for the application. The certificate contains the granted classes of service to the application as they were granted by the SDA.

Network Security Server. The Network Security Server (NSS) acts as the trusted on-line authority managing the policy activation for a given CU.

Host System/Application/CU. The host system on which the applications are installed and the CU services are being used form the execution elements to be controlled by the framework.

The security domain authority (SDA) is responsible for granting a set of classes of service (COS) 35 to the application domain authority. The SDA is also responsible for issuing policy cards which contain the COS information and the Touch Point data for the CU. The SDA manufactures this information upon request from the site which installs the CU into a host system.

The application domain authority (ADA) receives the COS elements granted by the SDA. It has the responsibility to issue application certificates 36 to the applications belonging to its domain. An application certificate contains the application ID and the COS granted by the ADA.

Applications receive a certificate from the ADA which they need to present to the CU to get the desired COS level. The CU, upon receiving the request, uses the certificate to determine whether the application has the right to access the requested cryptographic function If the COS requested through the application certificate matches the COS granted by the SDA to the ADA and stored in the policy card then the request is handled, otherwise it is not handled.

The network security server (NSS) 18 acts as an on-line instrument for policy negotiation and changes to the policy information stored on the policy card. If, for example, adding a class of service to the set of services normally requires the issuing of a new policy card with the changed information. Alternatively, the NSS performs an update of the policy card on behalf of the SDA. The NSS also plays the role of activation system 37 for virtual policy cards.

Basic ICF Host System Assumptions

The ICF architecture rests on a few very basic assumptions about the core elements, as listed below.

Certification. All software elements have a level of trust associated with them, whether they are firmware components installed inside the CU or applications using the services exported by the CU. The methodology used to transfer trust in software throughout ICF is certification. All trusted operations, e.g. the downloading of firmware modules or an application for a certain level of service, involves the validation of the associated certificate.

Providing Cryptographic Functions. The CU does not provide the HS with any cryptographic functions without being in possession of a PAT.

Separation. Under no circumstances can user data being processed within the CU be accessed by the policy elements, regardless of PAT format. Likewise, under no circumstances should the host system have access to the policy's Touch Point data information.

Trust Relation Between Applications and CU Services

Applications are the requesting element in ICF. Typically, they run on a host system and request services from the CU.

An integral part of the ICF architecture is the bi-directional trust relation between the application requesting a service and the service provider delivering this service. As described in U.S. patent application Ser. No. 08/748,085 (Dynamic Classes of Service for An International Framework); U.S. patent Application Ser. No. 08/770,747 (Software Level Touch Points for an International Cryptography Framework); U.S. patent application Ser. No. 08/702, 331 (Application Certification for an International Cryptography Framework); U.S. patent application Ser. No. 08/702, 304 (Method and Apparatus for Enforcing the Use of Cryptography in an International Cryptography Framework); U.S. patent application Ser. No. 08/702,332 (Method and Apparatus for Trusted Processing); and U.S. patent application Ser. No. 08/685,076 (Cryptographic Unit Touch Point Logic), which patent applications are incorporated herein by this reference thereto, a system can be constructed consisting of an application and a cryptographic unit which assumes no other trusted elements than the CU and a trusted direct path to the application code image. The CU validates the identity of the application based on the code image before providing the desired service.

Figure 4:
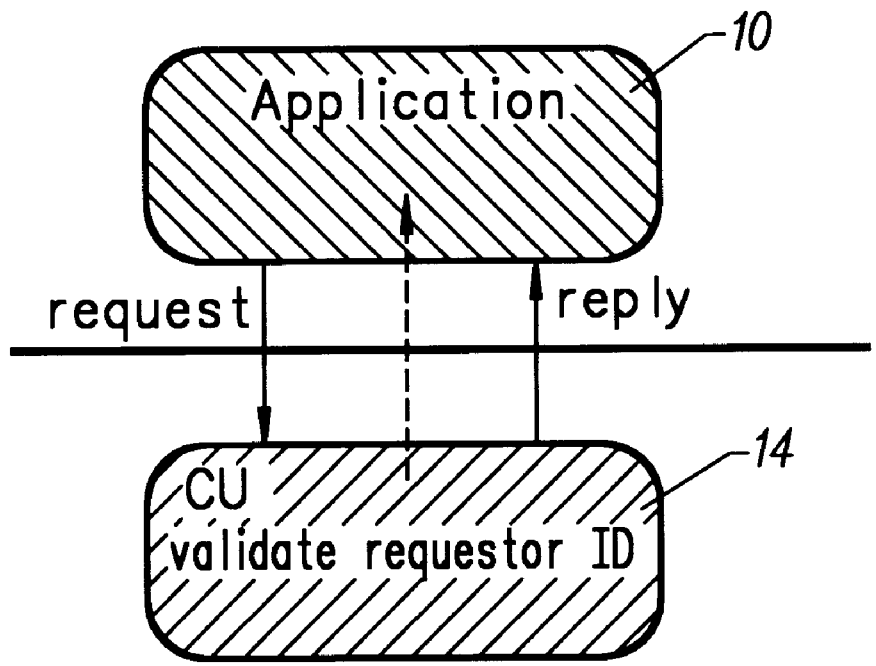
FIG. 4 is a block diagram showing a trust relation between an application and a cryptographic unit according to the invention.

FIG. 4 illustrates the trust relation between an application 10 and a CU 14. For systems which do not provide this type of access from the CU to the host system memory space, the challenge becomes to establish one or more mechanisms which strengthen the trust relation between the two communicating elements. There are two principal strategies. One is to construct a line of trusted elements from the CU to the application, the other approach is to guard the CU/application interaction with many validation checks, which varies attack detection time.

One aspect of the invention constructs a line of trusted elements from the CU to the application. For example, with the CU at the bottom of a chain of trusted elements, the CU is able to validate the OS drivers needed for passing a request to the CU. The validated drivers can then implement trusted mechanisms to validate the driver calling modules, which themselves can implement, for example, validation schemes. Trust is extended towards the application. The assumption for the validations of the OS driver, i.e. the starting point of the chain of trust, is that there is sufficient trust built into the access control and authorization mechanisms of the Host system kernel.

The invention implements a series of validations and checks into the application/CU interaction. In this approach, rather than constructing a line of trust from the CU towards the application, several mechanisms and validation checks are implemented into the interaction between the CU and the application. While each of these mechanisms may not be powerful enough to withstand an attack, the combination of these mechanisms may make it sufficiently difficult for an attacker.

The following describes some of these mechanisms:

Strictly monotonically increasing sequence numbers. In this scheme both parties pass a strictly monotonically increasing number along with the request. If either party detects an unexpected number, then a failure in the communication, possibly an attack, can be assumed.

Pass challenge tokens along with the request. Both parties can pass a challenge back and forth which involves computation on both sides. The computation at each party relies on a previous value to detect sequence failures.

Use timer approaches. If operations are known to be within a certain time boundary, this information could be used to detect anomalies in processing, potentially hinting at an attack.

Ask the application party to pass randomly selected pieces of the code image to the CU party. In this scheme, the CU asks for a randomly selected memory portion of the application in an effort to ensure that a request cannot be issued by a malicious application. Because of the use of a chained hash scheme, such random selection of memory portions makes it more difficult for an attacker to guess the memory location and more easy for the system to detect such intervention.

All of these approaches have in common that they alone cannot guarantee the authenticity of the requesting application. The underlying challenge to all of these approaches is the non-trusted environment in which one cannot perform safe storage or safe computation to identify a party in this environment. All of the proposed schemes have weaknesses which make them subject to attack. The combination of the rather weak ground level schemes, however, proves to be very difficult to bypass without detection.

All approaches for strengthening the trust relation between the application and the CU as described above suffer from the fact that the application requests the operation and the operation is carried out inside the trusted boundary of the CU. The application is free to obtain the service otherwise, thereby completely bypassing the CU. The CU itself has very limited means to validate the application identity and needs to rely on, for example, the host environment.

A different split in responsibility between application and CU improves the situation considerably. If, for example, part of the application is executed inside the trust boundary of the CU, the application on the host system becomes incomplete and replacing this application or complementing the missing pieces becomes more difficult.

Larger blocks of application functionality inside the trust boundary also improve the situation by making the service exported from the CU more high level, thereby reducing the risk of misuse of lower functionality of the CU which is not exported anymore.

Application Support Elements
Application Authentication

ICF applications can be certified. A certificate contains identifying attributes of the application, e.g. the Application ID, the hash sum of the application code image, and the classes of service assigned to this application. This information is authenticated by means of a digital signature. The CU uses this information to accurately identify an application and determine the kind of access which can be granted.

The signature process, while straightforward, requires some administrative effort and a management infrastructure. Changing just one bit within the application code image, requires the system to go through the full process of producing the signature. Depending on the certification infrastructure, an application developer may need to submit its work to another entity to get it signed, which puts a serious constraint on the application distribution.

Replacing a version of an application by the next version requires a level of trust and control. The application authentication mechanism is used to validate the origin of an application before it is used. It is desirable for the target system to specify control options on the application update process. For example, a host system may decide not to accept new versions of a loaded application automatically.

Figure 5:
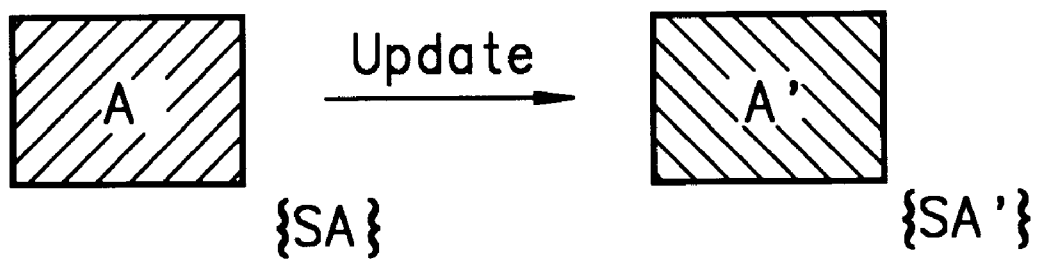
FIG. 5 is a block diagram that shows an application installation and update according to the invention.

FIG. 5 is a block diagram that shows an application installation and update according to the invention. Installing an application A' can be characterized by the dependency it has with respect to the previous application A.

No Dependency. A' is not related to A. The signing identity may not be the same. This is the most general case. Applications are referred to by the same name. Usually, the signing authority stays the same.

Signature Dependency. A' is only accepted if the signing identity is the same as that used in signing the module currently known. This is the most typical case. Applications are accepted and replace the previously installed application if the signature identifies a trusted application producer.

Backward Dependency. A' is only accepted if A' contains information about A and its signature. Direct backward dependency only accepts the immediate predecessor of A', indirect backward dependency accepts any module in the chain of previous A. This scheme considerably strengthens the control a system has over installing applications.

Forward Dependency. An application may specify options which influence the acceptance of a successor version A'.

Code Equivalence

Code equivalence is the fundamental property the Host System maintains while changes to certified applications are being loaded. The initial problem of code equivalence is bound to the known difficulty to demonstrate the correctness and computability of the initial code. In the preferred embodiment of the invention, the two criteria are achieved with an appropriate combination of development processes and procedures, as well as validation checkpoints.

Figure 6:
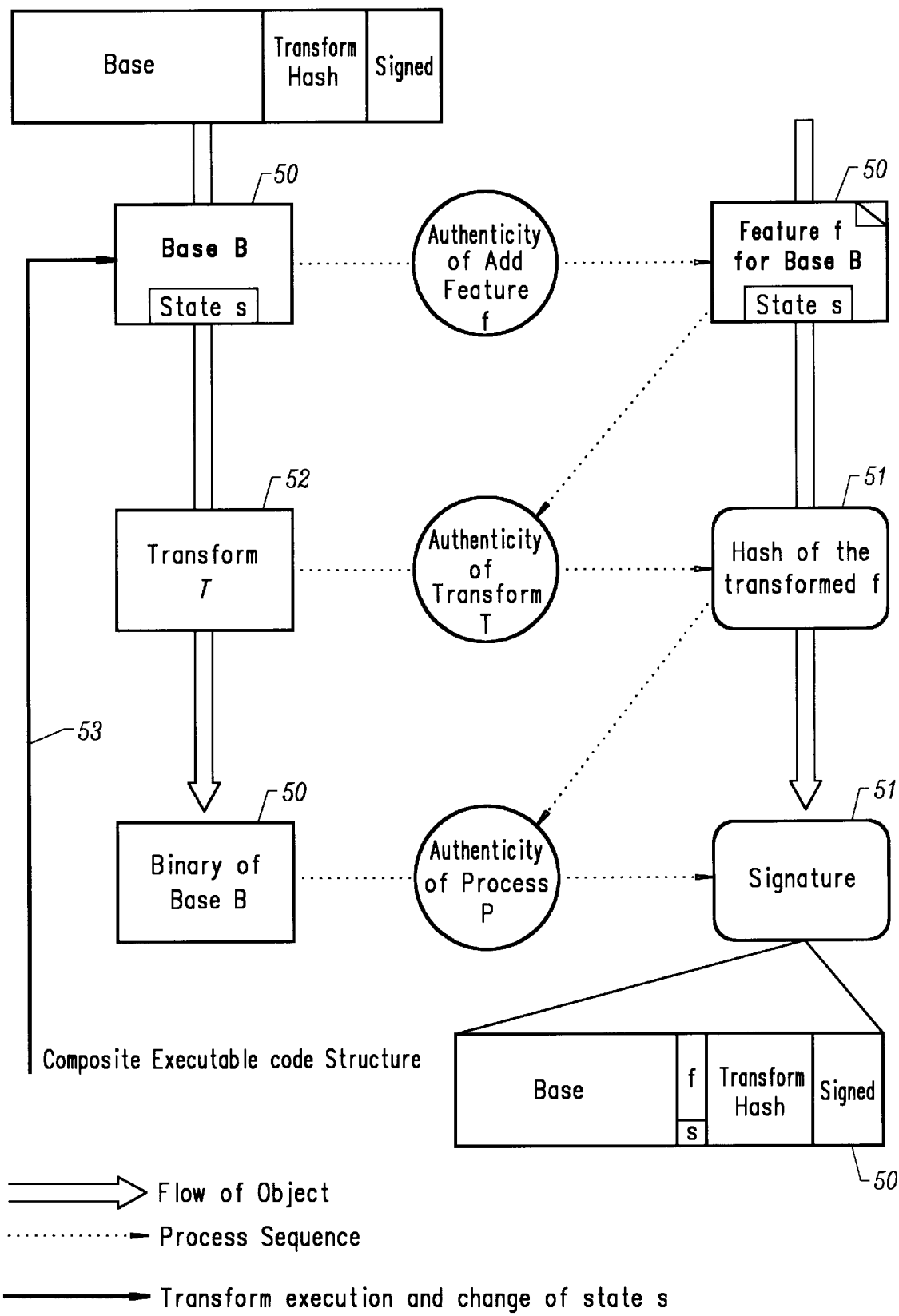
FIG. 6 is a block diagram showing the compound representation of the process of transforming a Base B with a transform T as approved by the signing Authority according to the invention.

The following steps describe how the specific criteria are achieved. The proposed heuristic builds on three parts:

The executable components 50, represented by the shadowed rectangles in FIG. 6;

The Checkpoint components 51, represented by the rounded rectangles in FIG. 6; and The Transform component 52, represented by a simple rectangle in FIG. 6.

For purposes of the discussion herein, there is no distinction in terminology between the code to be executed or the attached data structure when the word "component" is used.

Before the components are described, it is necessary to introduce the state variable. The following describes how the state variable is used. A fully functional, well contained subsystem is either part of the whole system or is the whole system itself and is characterized by a set of features. When the set of features is in the initial state, it is referred to as the Base. A Base in a given state could claim that the set of features f if the Base meets the correctness criteria. When the Base is upgraded, it is in fact augmented with new features e.g. f1 or state s. The upgrade means effectively a change of state from s to s+1. Hence, versions of the Base and the Edition are kept compatible because they refer to the same state. With this example in mind it is easy to introduce the two categories of executable components.

The Executable Components

The first category of executable components is the Base and the second category is the Feature, which either replaces existing features of the Base or augments the Base with new features. A new addition to the Base creates the new Base. The new Base is distinguished from the old Base by the change of value of the state variable, represented symbolically by s+1. In FIG. 6, the change of state is represented by the black arrow 53. As an illustration, the change of state goes through the following steps once the signature of the Base and new Compound Base is verified:

1. The transform hash refers to the chain of transform functions to be invoked to install the new feature in addition to the state s hash value.
2. If the hash matches the hashed reference chain and the state s, the Feature f is correct and can be installed.
3. The feature is installed using the Transform chain, e.g. dynamic link, load, or resolve.
4. The state of the new Base is updated to s+1.

The Checkpoint Components

The checkpoints are used to validate a stage in the process. The intermediate checkpoint, referred to as "Hash of the transformed f," refers to the transformation of the feature f by the transform function T.

The Transform Component

A Base can only be executed once compiled, loaded, and linked with the libraries and the data structures. Once loaded, the symbol resolution and the relocation has been solved, and the set of combined features is now the executable binary. The transform function represents all combined mechanisms involving the compiling, the loading and linking. A reference to hash of the chain of mechanisms is the reference transformation T.

Application Level Resource Map

Figure 7:
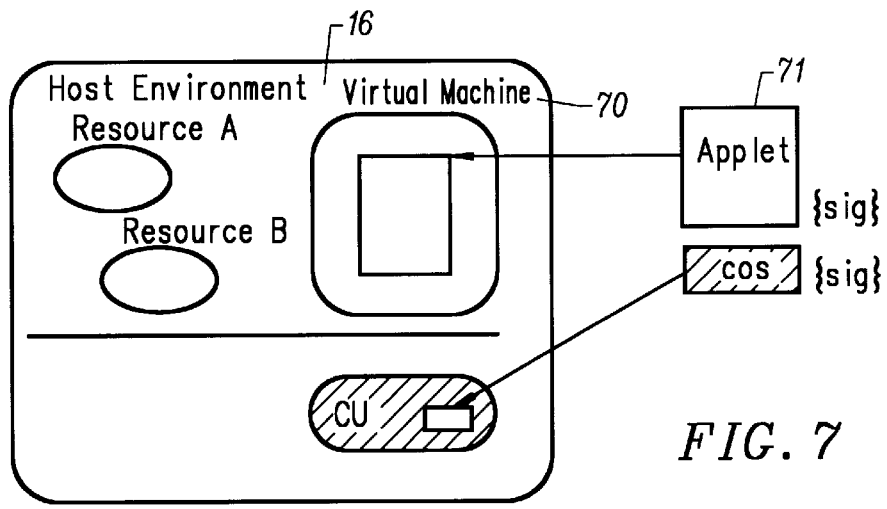
FIG. 7 is a block diagram that shows downloading and execution of an applet according to the invention.

FIG. 7 is a block diagram that shows downloading and execution of a software application module according to the invention. Typical environments found in client server architectures construct a closed environment in which the application runs. An example of this strategy is the Java virtual machine environment 70. In this example, applications 71, referred to as applets, are downloaded to the client system. A signature validation process can be applied to the applet to verify that the applet has been signed by a trusted entity, such as the supplier of the applet. After some further integrity checks, the applet is allowed to run inside the environment of the virtual machine.

Validating the authenticity and integrity of an applet is however only one aspect of the security requirements of the host system. Applets typically need to interact with the host system resources. This forces the system to provide gateways from the closed environment in which the applet executes to the host system resources. Current models which provide an all or nothing strategy are not sufficient to satisfy the needs of the applet designer.

The ICF architecture provides the concepts of a class of service which can be seen as the trusted description of an applications resource map, COS identifiers label the resource, COS attributes express what an application is capable of with respect to the host system resource. Issued and signed by an ICF domain authority, the Resource Map COS cannot be manipulated to acquire access to resources beyond the application assigned capabilities. The CU as the enforcing element itself is a trusted location where the evaluation of the application resource requirements takes place. Elements of the ICF architecture such as application level touchpoints, described in U.S. Pat. No. 5,651,068, and the fact that a CU can execute application methods in a secured location, further strengthen the validation of the executing applet.

Application Fixed Policy Activation Tokens

Application fixed policy activation tokens, referred to as fixed PATs, are tokens targeted at the activation of a cryptographic unit for a particular application. This is different from the physical or virtual PATs, which are targeted at the activation of a particular cryptographic unit.

The motivation for fixed PATs is to provide a unit of distribution which includes everything from application to the policy activation tokens necessary to enable the application to consume the cryptographic services provide by a CU.

Figure 8:
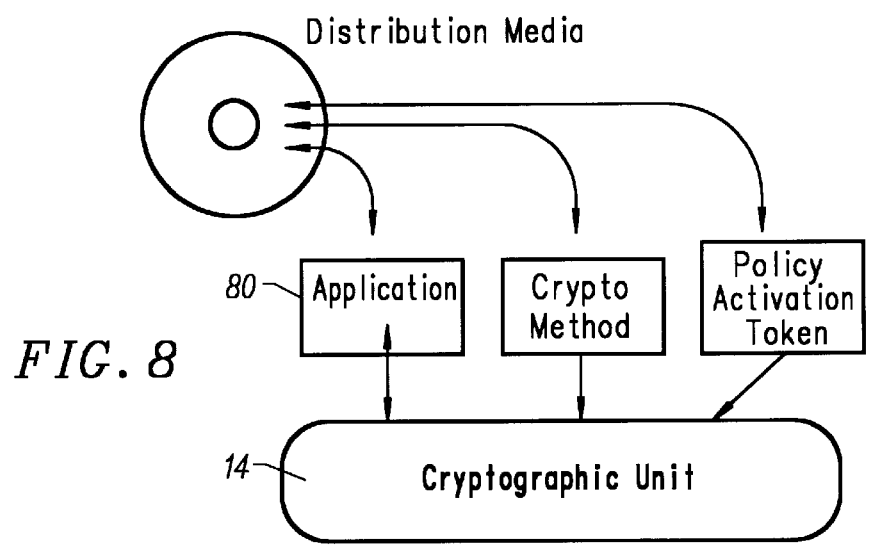
FIG. 8 is a block diagram that shows fixed policy activation tokens according to the invention.

FIG. 8 is a block diagram that shows fixed policy activation tokens according to the invention. In the example shown on FIG. 8:

Applications 80 have a unique identification, e.g. a serial number.

The COS constraint binds the application serial number to the COS.

There is a COS test level for this case.

Applications and Classes of Services

A class of service consists of a COS identifier, e.g. a number, and a descriptive part which contains the identifier of the associated method and constraints which must be evaluated before access to the method is granted. The descriptive part is signed by an authority to assure its authenticity and integrity.

COS identifiers can be distributed through a different channel than the descriptive part. For example, in the case where the COS is associated with a cryptographic method, the COS identifier is passed to application domain authorities which, in turn, hand them out to applications which request service from the CU. The COS descriptive part, i.e. the part which provides the CU with the necessary content to evaluate requests carrying the corresponding COS identifier, is distributed via the NSS infrastructure. In the case where the COS represents a non-cryptographic method, this separation may not be necessary.

The Principle of Decoupling

The ICF architecture defines clear responsibilities of the element application, resources, and administrative domain. Under ICF, applications request resources from the cryptographic unit using the Class of Service identifier, which labels the cryptographic attributes of the request, as the handle to that description. Besides cryptographic functions, other arbitrary operations can be labeled by this mechanism.

Classes of service are associated with an application by the administrative functions of the framework. Although an application can issue a request using a different COS, it has no way of modifying or creating the attributes encapsulated in the COS. The CU itself provides mechanism to validate that the application is using a COS which was assigned to it by a recognized domain authority.

Figure 9:
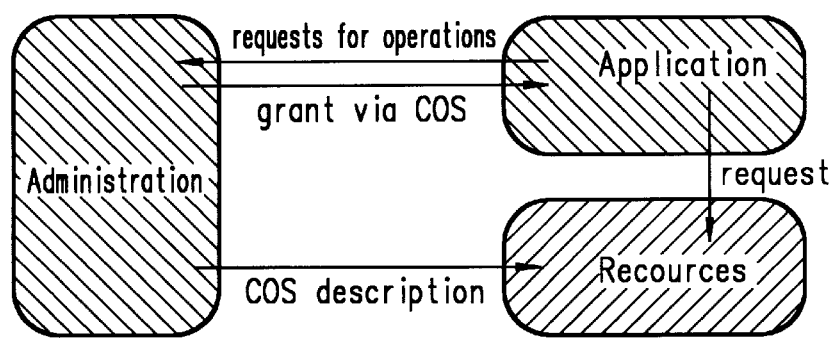
FIG. 9 is an illustration of the principle of decoupling according to the invention.

Class of service attributes, i.e. the content of the COS describing the operation to be carried out by the resource, are determined and controlled by the administrative functions available to the domain authorities. There is no path for the application developer to influence the content of a COS. This decoupling of administrative functions from application developer and application user is a key principle of the ICF architecture. FIG. 9 provides a graphic illustration of this principle.

As applications are more and more handling enterprise critical data and consumer private data, the isolation of application creators from manipulating the underlying resources is becoming a key requirement. This requirement which only existed in a few financial applications and perhaps classified applications is now making inroads to other applications categories dealing with electronic commerce as well.

PAT Support Elements

Class of Service Mapping

Applications communicate their requests to the cryptographic unit for execution. Each request has to contain information which allows the cryptographic unit to derive the class of service for this request. The ICF defines two major approaches to mapping the request to the COS ID:

Applications can pass the COS identification number along with the request. For example, the application certificate issued for the application contains the authorized classes of service identifiers.

The application can issue the request. It is the responsibility of the CU to analyze the request attributes and to determine the closest class of service which satisfies the request.

Figure 10:
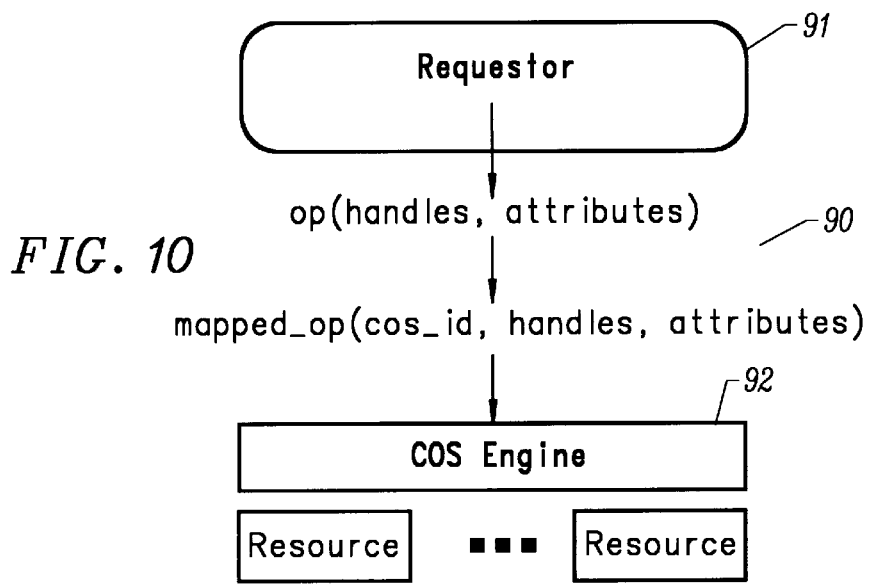
FIG. 10 is a block diagram that shows class of service mapping according to the invention.

FIG. 10 is a block diagram that shows class of service mapping according to the invention. Applications can either pass the class of service to the COS engine, or the attributes of the desired operation. For example, a cryptographic operation could have attributes on algorithm type or key length. The mapping function 90 analyzes the request 91 attributes and determines the COS which satisfies constraints described in the attribute list. The least capable COS is selected. If no COS is suitable, either the request is rejected, or the request attributes are passed forward to the network security server to select the appropriate COS.

The same scheme of COS mapping could also be used to implement an authorization engine 92. In a typical authorization engine, the caller passes a set of request attributes which are compared to a set of privilege attributes following the authorization rule. If the result is positive, the caller is allowed to go ahead, otherwise not. The fact that a mapping COS could be found can be seen as positive authorization.

Class of Service Identifiers

Figure 11:
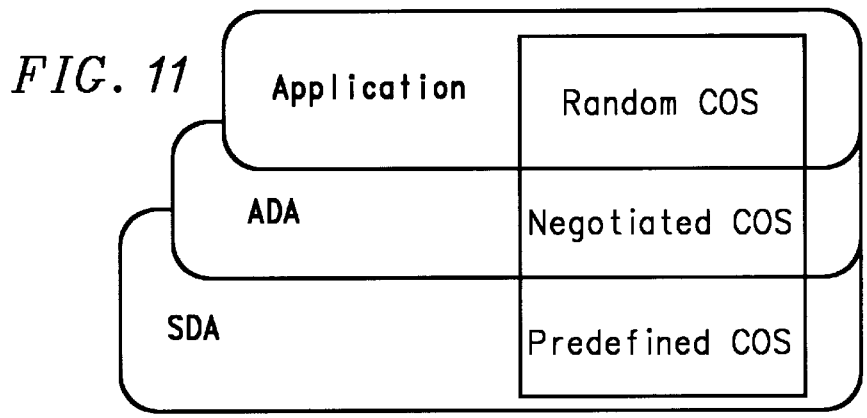
FIG. 11 is an illustration of the COS identifier name space according to the invention.

COS identifiers can be grouped into several categories. They are labelled predefined COS identifiers, negotiated or assigned COS identifiers, and random COS identifiers. All COS identifiers form a number space with ranges assigned to the different categories defined. FIG. 11 shows the COS identifiers name space and its relation to the SDA, ADA, and Applications.

COS Identifiers Name Space

Figure 12:
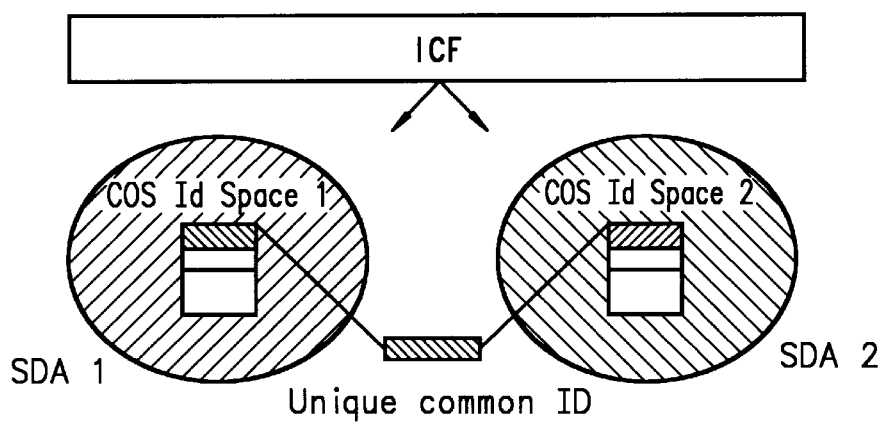
FIG. 12 is a block diagram that shows a predefined class of service identifiers according to the invention.

Predefined COS identifiers. FIG. 12 is a block diagram that shows predefined class of service identifiers according to the invention. Predefined COS identifiers are unique across every SDA. They are reserved for the ICF infrastructure classes of service needed to manage and control the ICF management operations. A predefined class of service is always signed by the ICF domain authority and the identifier is passed separately from the descriptive part.

Figure 13:
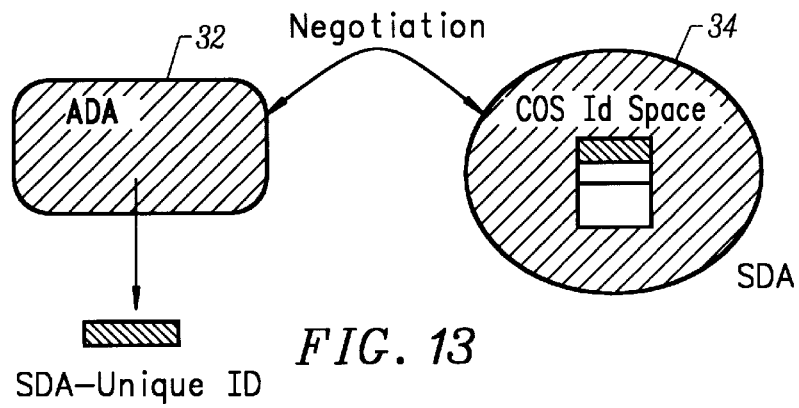
FIG. 13 is a block diagram that shows negotiated class of service identifiers according to the invention.

Negotiated COS identifiers. FIG. 13 is a block diagram that shows negotiated class of service identifiers according to the invention. Negotiated identifiers are the result of an interaction between the ADA 32 and the SDA 34. A typical example is the generation of a class of service identifier for a certain set of cryptographic operation the ADA wants to grant within its domain. An ADA asking for the authorization to use a class of service is returned a COS identifier for the desired COS. A COS does not necessarily have to be created upon receiving such a request. For example, an ADA could browse a public dictionary containing all defined classes of service and request authorization for a suitable one. The returned COS identifier is unique to the ADA/SDA relationship established by this request.

Negotiated COS identifiers are always unique within a security authority domain. However, it is quite feasible for one or many SDAs to agree on a COS identifier which is the same across these domains. In a sense it becomes a predefined COS identifier. However, the selection of the same COS identifier is performed by agreement, not by definition as is the case for predefined COS identifiers.

Agreement between two or many domains could also be achieved through the concept of COS mapping. It is not a requirement of the ICF architecture to have the same COS identifier for the same COS description. Two descriptions, i.e. COS attributes and constraints, can be the same and still be represented by a different identifier, even within the same domain.

Figure 14:
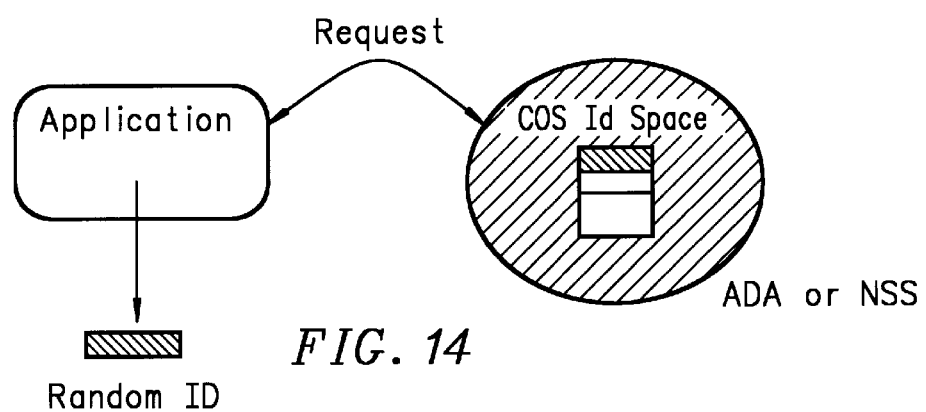
FIG. 14 is a block diagram that shows random class of service identifiers according to the invention.

Random COS Identifiers. FIG. 14 is a block diagram that shows random class of service identifiers according to the invention. Random COS identifiers extend the COS concept to accommodate an application's need to request a COS dynamically for an operation created ad hoc during application execution. Although an SDA and ADA can generate a random COS if needed, random COS identifiers are typically used by an application. Random COS identifiers have no meaning in another domain.

Random COS identifiers add a new sense of privacy to the COS. They may be used to identify a COS representing a method agreed on by two parties which does not necessarily have to be visible to everyone else. A random COS could be used to describe a one time operation, e.g. a financial transaction. They are created not through the ADA/SDA interaction, but through an application/NSS interaction. ADAs or applications, given they have a COS to create a random COS, can create them for a single transaction, e.g. a merchant server authorizing a credit card transaction.

Random COS usage scenarios include: Scenario 1: A company may ship an application with some of the application code associated with a COS. This code is downloaded into the CU and executes within the perimeters of the CU. The COS, a random COS guarding the code, is created by the application manufacturer and can be seen as the authorization token for the execution o of the application. COS attributes, such as number of usage or expiration time, are used to build a payment infrastructure.

Scenario 2: Agent technologies create mobile units of code, agents, which are sent to a target system and execute their on their owners behalf. The challenge is for the recipient client system to establish isolation boundaries for the agent to execute in. Solutions proposed so far either proposed a sandbox model, which gives no access to the client system resources, no limitations which make the client system subject to all forms of attack, or a coarse grained set of access rules for the visiting agent.

An agent accompanied by a COS provides a more robust mechanisms for describing the agent, its identity, and the constraints to place on the execution of the agent. Through the COS signature structure, the identity of the agent can be determined reliably, the constraints are guaranteed to not have been tampered with. A CU, a tamper resistant place on the client system, reliably analyzes the COS attributes and triggers the execution of the agent.

Scenario 3: Usage of random COS in Authorization Processors. An authorization processor typically implements a decision system which evaluates application request attributes, called transaction attributes, with a set of privilege attributes, according to a fixed rule describing the authorization. The challenge for such systems have always been to store the privilege attributes securely and to provide a robust and tamper resistance evaluation environment for the authorization processor itself. Typical design implemented a centralized authorization service to which client system requesting an authorization establishes a secure channel and to which it sends the transaction attributes. The answer sent back is them used by the application.

Random COS are a secure way to transmit a the privilege attributes to the client system and to place the authorization evaluation into the CU of the client system. The net result is a significant improvement in locality of the decision making, while still keeping the necessary level of security.

As the scenarios above show, random COS identifiers extend the ICF infrastructure in a powerful way in that they allow to label operations and associate attributes with them on an ad hoc basis. The evaluation and enforcement of the attributes rests on the trust foundation established through the cryptographic unit and the ICF domain authorities.

COS Identifier Comparison

Table 1 below summarizes the different COS identifier types and their characteristics.

TABLE 1

COS Identifier Types

| | Fixed COS | Negotiated COS | Random COS |
|---|---|---|---|
| Who defines? | ICF | ADA/SDA | |
| General Use | ICF methods | Cryptographic methods | Other methods |
| Use for cryptographic methods | Yes | Yes | No |
| Use for other methods | Yes | Yes | Yes |
| Distribution of ID vs.. content | Always separate | Separate for cryptographic methods, optionally separate for other methods | Optionally separate |
| Signed by | SDA | SDA | CU/ADA/NSS |

Variant and Invariant COS Attributes

Figure 15:
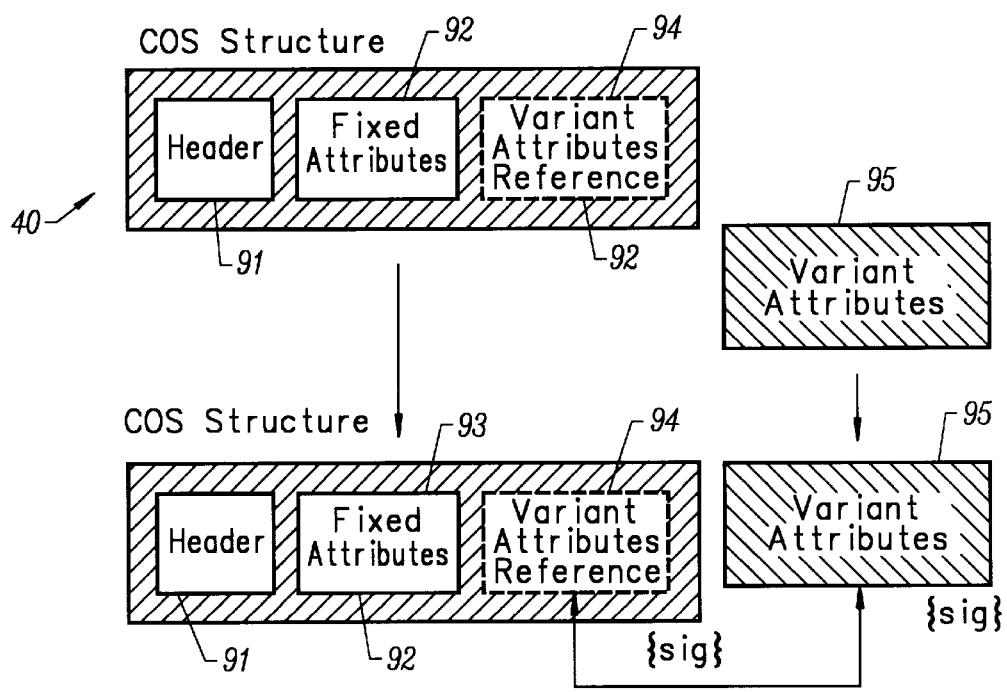
FIG. 15 is a block diagram that shows variant and invariant class of service attributes according to the invention.

FIG. 15 is a block diagram that shows variant and invariant class of service attributes according to the invention. Class of services are defined and created by the security domain authority. A COS 190 consists of an identifier 191 and a set of attributes 192 which describe the operation represented by the COS and the constraints on that operation. The COS is signed by the security domain authority to prove its authenticity and to guarantee its integrity as it is passed through the ICF distribution infrastructure.

The receiver of the COS, i.e. entities who are in charge to create PATs for a particular CU, may wish to add additional constraints for a given COS. The ICF defines a method which addresses this need. Variant COS attributes do not define the actual attribute value. Instead they define the valid range of the attribute which can be defined by other administrative elements of the framework.

A COS may have an invariant 193 and a variant 194 section of COS attributes. The invariant section defines the COS attribute value which cannot be changed or overridden once the COS is created and signed by the SDA. The COS attribute variant section defines attributes which have a range of valid values defined for the attribute and an attribute value which is assigned by default. The number and type of attributes is defined at creation time and cannot be changed at a later point of time. Attributes cannot be added or removed from a COS, invariant attributes cannot be made variant and vice versa.

The range of attribute values for an variant attribute 195 can be expressed as a range or a set of values. Numerical attributes, for example, may specify a range characterized by a lower and an upper numerical bound. Enumeration attributes may explicitly specify the permissible values as a list of values.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications; and a cryptographic service provider that provides access for said one or more applications to said cryptographic unit;

wherein said trust relation is established by a plurality of validation checks which guard interaction between said one or more applications and said cryptographic unit by providing a combination of several schemes which, while individually are weak, are in combination difficult to bypass without detection, said validation checks comprising:

a mechanism in which said one or more applications passes randomly selected pieces of a code image to said cryptographic service provider.

2. The apparatus of claim 1, wherein said trust relation is established by a line of trusted elements from said cryptographic unit to said one or more applications.

3. The apparatus of claim 1, said validation checks comprising:

a series of strictly monotonically increasing sequence numbers which are passed with each request for communication between said one or more applications and said cryptographic unit, wherein a failure in communication is assumed if either said one or more applications or said cryptographic service provider detects a number out of sequence in the montonically increasing sequence.

4. The apparatus of claim 1, said validation checks comprising:

challenge tokens that are passed along with each request for communication between said one or more applications and said cryptographic service provider, wherein said challenge token requires computation by both said one or more applications and said cryptographic service provider; and wherein said computation relies on a previous value to detect sequence failures.

5. The apparatus of claim 1, said validation checks comprising:

a timer which determines a preestablished service time boundary to detect anomalies in processing or events.

6. The apparatus of claim 1, wherein part of said one or more applications is executed inside a trust boundary of said cryptographic unit.

7. The apparatus of claim 1, further comprising:

a signature validation mechanism that is applied to a module to verify that said module has been signed by a trusted entity, wherein said module is allowed to run inside a prescribe environment of a virtual machine.

8. The apparatus of claim 1, further comprising:

a plurality of application level Touch Points which secure said one or more applications from unauthorized use.

9. The apparatus of claim 1, wherein said one or more applications is certified by a certificate containing the identity of the one or more applications and those classes of service assigned thereto, wherein said certificate is used by said cryptographic unit to identify said one or more applications and determine the level of access to cryptographic services that can be granted thereto.

10. The apparatus of claim 9, wherein said one or more applications identity is authenticated by a signature over a hash sum of said one or more applications code image.

11. The apparatus of claim 10, wherein said authentication mechanism further comprises:

control options for an update process.

12. The apparatus of claim 1, further comprising:

fixed policy activation tokens which activate a cryptographic unit for a particular application.

13. The apparatus of claim 12, wherein said one or more applications have a unique identifier; and wherein a class of service constraint binds said unique identifier to said class of service.

14. The apparatus of claim 13, wherein a class of service comprises:

a class of service identifier and a descriptive part which contains an identifier of an associated method and constraints which must be evaluated before access to said method is granted.

15. The apparatus of claim 14, wherein said descriptive part is signed by an authority to assure its authenticity and integrity.

16. The apparatus of claim 13, wherein one or more applications pass a class of service identifier to said cryptographic unit with a request for cryptographic services.

17. The apparatus of claim 13, further comprising:

one or more security domain authorities; and predefined class of service identifiers which are unique across every security domain authority.

18. The apparatus of claim 13, further comprising:

one or more application domain authorities;

one or more security domain authorities; and negotiated class of service identifiers which are the result of an interaction between said application domain authority and said security domain authority.

19. The apparatus of claim 13, further comprising:

random class of service identifiers which accommodate one or more applications need to request a class of service dynamically for an operation created ad hoc during execution.

20. The apparatus of claim 13, further comprising:

a predefined class of service which is signed by a domain authority and in which said identifier is passed separately from a descriptive part which contains an identifier of an associated method and constraints which must be evaluated before access to a method is granted.

21. The apparatus of claim 13, wherein said class of service comprises invariant attributes which define a class of service attribute value that cannot be changed or overridden once said class of service is created and signed.

22. The apparatus of claim 13, wherein said class of service comprises variant attributes which define a class of service attribute that has a range of valid values defined for said attribute and an attribute value which is assigned by default, wherein the number and type of attributes is defined at creation time and cannot be changed at a later point of time.

23. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications; and a cryptographic service provider that provides access for said one or more applications or operating systems to said cryptographic unit;

wherein said trust relation is established by a plurality of validation checks which guard interaction between said one or more applications and said cryptographic unit by providing a combination of several schemes which, while individually are weak, are in combination difficult to bypass without detection, said validation checks comprising:

a mechanism in which said cryptographic unit requests randomly selected pieces of a code image to ensure that a request to said cryptographic service provider cannot be issued by a malicious application.

24. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications; and a cryptographic service provider that provides access for said one or more applications or operating systems to said cryptographic unit;

wherein said trust relation is established by a plurality of validation checks which guard interaction between said one or more applications and said cryptographic unit by providing a combination of several schemes which, while individually are weak, are in combination difficult to bypass without detection, said validation checks comprising:

a mechanism in which said one or more applications in said cryptographic unit request randomly selected pieces of a code image using a chained hash mechanism to render guessing by an attacker more difficult and to render detection of said attack trivial.

25. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications; and a cryptographic service provider that provides access for said one or more applications or operating systems to said cryptographic unit;

wherein replacing a present version of said one or more applications by a next version thereof requires an authentication mechanism for said cryptographic unit to validate the origin of said next version before it is used;

wherein said one or more applications next version is only accepted if its signing identity is the same as that used in signing said present version.

26. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications; and a cryptographic service provider that provides access for said one or more applications or operating systems to said cryptographic unit;

wherein replacing a present version of said one or more applications by a next version thereof requires an authentication mechanism for said cryptographic unit to validate the origin of said next version before it is used;

wherein said one or more applications next version is only accepted if it contains information about said present version and its signature.

27. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications; and a cryptographic service provider that provides access for said one or more applications or operating systems to said cryptographic unit;

wherein replacing a present version of said one or more applications by a next version thereof requires an authentication mechanism for said cryptographic unit to validate the origin of said next version before it is used;

wherein said cryptographic unit only accepts an immediate predecessor of said next version.

28. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications; and a cryptographic service provider that provides access for said one or more applications or operating systems to said cryptographic unit;

wherein replacing a present version of said one or more applications by a next version thereof requires an authentication mechanism for said cryptographic unit to validate the origin of said next version before it is used;

wherein said cryptographic unit accepts any one or more applications in a chain of previous applications.

29. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications; and a cryptographic service provider that provides access for said one or more applications or operating systems to said cryptographic unit;

wherein replacing a present version of said one or more applications by a next version thereof requires an authentication mechanism for said cryptographic unit to validate the origin of said next version before it is used;

wherein said present one or more applications may specify options which influence the acceptance of successor applications.

30. An apparatus for establishing a trust relation that provides one or more degrees of trust within one or more applications by expanding a level of trust provided by elements of an international cryptography framework, wherein said international cryptography framework comprises a cryptographic unit, said apparatus comprising:

a host system, said host system providing an execution environment that supports execution of said one or more applications;

a cryptographic service provider that provides access for said one or more applications to said cryptographic unit; and fixed policy activation tokens which activate a cryptographic unit for a particular application;

wherein said one or more applications have a unique identifier; and wherein a class of service constraint binds said unique identifier to said class of service;

wherein a class of service comprises a class of service identifier and a descriptive part which contains an identifier of an associated method and constraints which must be evaluated before access to said method is granted; and wherein class of service identifiers are distributed through a different channel than that of said descriptive part.

31. The apparatus of claim 30, wherein a class of service identifier is passed to an application domain authority which, in turn, passes said class of service identifier to said one or more applications which request service from said cryptographic unit.

* * * * *